United States Patent
Gross et al.

(10) Patent No.: US 6,507,739 B1
(45) Date of Patent: Jan. 14, 2003

(54) APPARATUS AND METHODS FOR CONTROLLING A CELLULAR COMMUNICATIONS NETWORK HAVING AIRBORNE TRANSCEIVERS

(75) Inventors: Jonathan H. Gross, Gilbert; Thomas Peter Emmons, Jr., Mesa, both of AZ (US); Michael A. Tessler, Plano, TX (US)

(73) Assignee: Motorola, Inc., Schaumburg, IL (US)

(*) Notice: Subject to any disclaimer, the term of this patent is extended or adjusted under 35 U.S.C. 154(b) by 268 days.

(21) Appl. No.: 09/605,083

(22) Filed: Jun. 26, 2000

(51) Int. Cl.$^7$ ............... H04Q 7/20; H04B 7/15; H04B 7/185
(52) U.S. Cl. ............. 455/431; 455/11.1; 455/12.1; 455/427
(58) Field of Search .................. 455/431, 430, 455/432, 11.1, 12.1, 13.1, 517, 428, 427, 15, 25, 7; 342/356, 357.1, 352, 2

(56) References Cited

U.S. PATENT DOCUMENTS

| | | | |
|---|---|---|---|
| 2,598,064 A | 5/1952 | Lindenblad | |
| 2,626,348 A | 1/1953 | Nobles | |
| 2,627,021 A | 1/1953 | Hansell et al. | |

(List continued on next page.)

FOREIGN PATENT DOCUMENTS

| | | |
|---|---|---|
| EP | 0 421 704 A2 | 4/1991 |
| EP | 0 618 704 A1 | 10/1994 |
| EP | 0 789 498 A2 | 8/1997 |
| EP | 0 803 742 A2 | 10/1997 |
| EP | 0 837 567 A2 | 10/1997 |
| EP | 0 901 240 A2 | 3/1999 |
| EP | 0 939 569 A1 | 9/1999 |
| FR | 2757331 | 12/1996 |
| GB | 2318948 A | 5/1998 |
| GB | 2 320 992 A | 7/1998 |
| JP | 3104426 A2 | 5/1991 |
| WO | WO 96 02094 | 1/1995 |
| WO | WO 95 04407 | 2/1995 |
| WO | WO 96 16489 | 5/1996 |
| WO | WO 97 07609 | 2/1997 |
| WO | WO 97 19525 | 5/1997 |
| WO | WO 97 23104 | 6/1997 |
| WO | WO 98 44639 | 10/1998 |
| WO | WO 98 51568 | 11/1998 |
| WO | WO 99 13598 | 3/1999 |
| WO | WO 99 23769 | 5/1999 |
| WO | WO 99 45609 | 9/1999 |
| WO | WO 99 46877 | 9/1999 |
| WO | WO 00 14902 | 3/2000 |

OTHER PUBLICATIONS

"51.84 Mbps Airborne Wireless Experiments: A Prelude to the Emerging HALO™ Communication Technology", 1999, Jon Aasterud et al.

"Establishing Wireless Communications Services via High–Altitude Aeronautical Platforms: A Concept Whose Time Has Come?" Djuknic et al., IEEE Communications Magazine, Sep. 1, 1997, pp. 128–135.

(List continued on next page.)

Primary Examiner—Tracy Legree
(74) Attorney, Agent, or Firm—Ingrassia, Fisher & Lorenz, P.C.

(57) ABSTRACT

A cellular communications network (200, FIG. 2) includes one or more aircraft (210), which provide communication channels to cellular communications units, and also communicate with one or more base transceiver stations (206) and a control center (214). The control center receives (502, 602) telemetry and flight parameter information from the aircraft, and calculates (510, 606) network parameters based on the information. The control center transmits (512, 608) messages to the cellular network, including the aircraft, based on the calculated network parameters, and the aircraft and cellular network controls (612) its operations according to information within these messages.

19 Claims, 9 Drawing Sheets

U.S. PATENT DOCUMENTS

| | | | |
|---|---|---|---|
| 2,748,266 | A | 5/1956 | Boyd et al. |
| 3,866,227 | A | 2/1975 | Ruvin |
| 5,063,387 | A | 11/1991 | Mower |
| 5,067,172 | A | 11/1991 | Schloemer |
| 5,123,112 | A | 6/1992 | Choate |
| 5,187,805 | A | 2/1993 | Bertiger et al. |
| 5,455,964 | A | 10/1995 | Roos et al. |
| 5,479,482 | A | 12/1995 | Grimes |
| 5,530,909 | A | 6/1996 | Simon et al. |
| 5,548,292 | A | 8/1996 | Hirschfield et al. |
| 5,557,656 | A | 9/1996 | Ray et al. |
| 5,559,865 | A | 9/1996 | Gilhousen |
| 5,574,968 | A | 11/1996 | Olds et al. |
| 5,619,211 | A | 4/1997 | Horkin et al. |
| 5,625,867 | A | 4/1997 | Rouffet et al. |
| 5,657,032 | A | 8/1997 | Liechty et al. |
| 5,678,184 | A | 10/1997 | Cutler, Jr. et al. |
| 5,774,790 | A | 6/1998 | Dupuy |
| 5,790,939 | A | 8/1998 | Malcolm et al. |
| 5,832,380 | A | 11/1998 | Ray et al. |
| 5,890,079 | A | 3/1999 | Levine |
| 5,937,349 | A | 8/1999 | Andresen |
| 5,974,349 | A | 10/1999 | Levine |
| 6,006,084 | A | 12/1999 | Miller et al. |
| 6,018,659 | A | 1/2000 | Ayyagari et al. |
| 6,061,561 | A | 5/2000 | Alanara et al. |
| 6,061,562 | A | 5/2000 | Martin et al. |
| 6,072,428 | A | 6/2000 | Schipper et al. |
| 6,073,004 | A | 6/2000 | Balachandran |
| 6,127,946 | A | 10/2000 | Tzidon et al. |
| 6,285,878 | B1 * | 9/2001 | Lai .............................. 455/431 |
| 6,324,398 | B1 * | 11/2001 | Lanzerotti et al. .......... 455/431 |

OTHER PUBLICATIONS

"On the Use of HALE Platforms as GSM Base Stations", IEEE Personal Communications, Apr. 2001, vol. 8 No. 2, pp. 37–43.

"Relay Aircraft Enable Cell 'Network in the Sky'", William B. Scott, Aviation Week andS Space Technology, Jun. 29, 1998, pp. 22–23.

"Revised Technical And Operational Parameters For Typical–IMT–2000 Terrestrial Systems Using High Altitude Platform Stations And CDMA Radio Transmission Technologies", Radiocommunication Study Groups, Mar. 4, 1999.

"Skystation Stratospheric Telecommunication New Payload Description", Mini, Missoni, Pauro, Proceeding of 17 of the AIAA ICSSC, 1997, pp. 235–242.

"Wireless Communication Systems using Stratospheric Platforms", Hase, Technical Report of IEICE, 2000.

"Airborne Relay Communication System" –System Demostration –public handout at public demostration, May 1, 1998, 36 pages.

"Concept Overview", Angel Technologies Corporation Web Page Printout, *(www.angelcorp.com)*, Mar. 1998, 7 pages.

"Hail HALE, the Answers May All Be Here", Thomas W. Will, Ph.D., Joseph N. Pelton, Ph.D., Unmanned Systems Magazine, Winter 1995, pp. 31–34.

"High–Capacity Aerial Vehicles Aid Wireless Communications", Signal Magazine, Apr. 1997, 6 pages.

"Geosynchronous Satellites at 14 Miles Altitude?", Joseph N. Pelton, Ph.D., New Telecom Quarterly, Second Quarter 1995 (2Q95), pp. 11–16.

* cited by examiner

FIG. 1  — PRIOR ART —

APPARATUS AND METHODS FOR CONTROLLING A CELLULAR COMMUNICATIONS NETWORK HAVING AIRBORNE TRANSCEIVERS

TECHNICAL FIELD

The invention relates generally to cellular communications networks and, more specifically, to controlling operations of a cellular communications network having airborne transceivers.

BACKGROUND OF THE INVENTION

Terrestrial cellular communications networks have provided convenient wireless communications services for years. These services include, for example, cellular telephone services, paging, Internet access, and data transfer services, among others.

FIG. 1 illustrates a simplified block diagram of a terrestrial cellular communications network 100, in accordance with the prior art. Network 100 includes one or more base station antennas 102 coupled to base transceiver stations (BTS) 103. Each BTS 103 communicates, via antennas 102 and subscriber links 104, with cellular communication units carried by mobile users 106. Essentially, the BTS modulates and demodulates the information exchanged on the subscriber links 104, and it converts signals to and from the format used over the subscriber links. Subscriber links 104 may support a time division multiple access (TDMA, e.g. IS-136, GSM), code division multiple access (CDMA, e.g. IS95), or other type of digital or analog communication protocol.

BTS 103 also are coupled to a mobile switching office (MSO) 110. This can be a direct connection (e.g., using fiber optic or telephone (e.g., T1) links 105), or the connection 108 can be chained through other BTS.

When data originates from or is destined for a public switched telephone network (PSTN, not shown), this data is routed through a mobile switching office (MSO) 110. Essentially, the MSO 110 includes a switch that interfaces the cellular network and the PSTN.

Network 110 is optimized via various performance parameters. For example, these performance parameters include power control parameters, handoff parameters (e.g., thresholds, averaging parameters, and hysteresis), access parameters (e.g., the minimum received signal level required before a communication unit is granted access to the system), handoff candidate information for neighboring cells, and the designation of which channels are control channels and which are traffic channels.

In a well-designed network, these performance parameters are selected to achieve near optimal network performance. Usually, these performance parameters are determined only when major changes in the network configuration occur, such as during network installation or when additional cell sites are added (e.g., to improve network coverage or capacity). In a terrestrial network, thus, the network optimization process is relatively static. This is considered acceptable, because the network infrastructure and communications quality are considered to be relatively stable. The infrastructure is geographically fixed in a terrestrial cellular network, and the communications quality is not substantially affected by or the system design considers variables such as weather (e.g., thunderstorms, high winds).

In order to increase capacity in a terrestrial cellular network, additional BTS must be added to the network. Adding such additional equipment may take weeks or months, and in some cases it is impossible to incorporate new equipment into an existing infrastructure. Therefore, prior art terrestrial networks cannot rapidly respond to a level of user demand that exceeds the network's then-current capacity. . . .

What is needed is a cellular communications network that is able to more rapidly respond to changing capacity demands by quickly modifying network infrastructure or configuration. Further needed is a method for rapidly determining performance parameters for a modified network infrastructure or configuration and quickly implementing the parameters' use so that optimal network performance can be continuously maintained.

DETAILED DESCRIPTION

Figure 1:
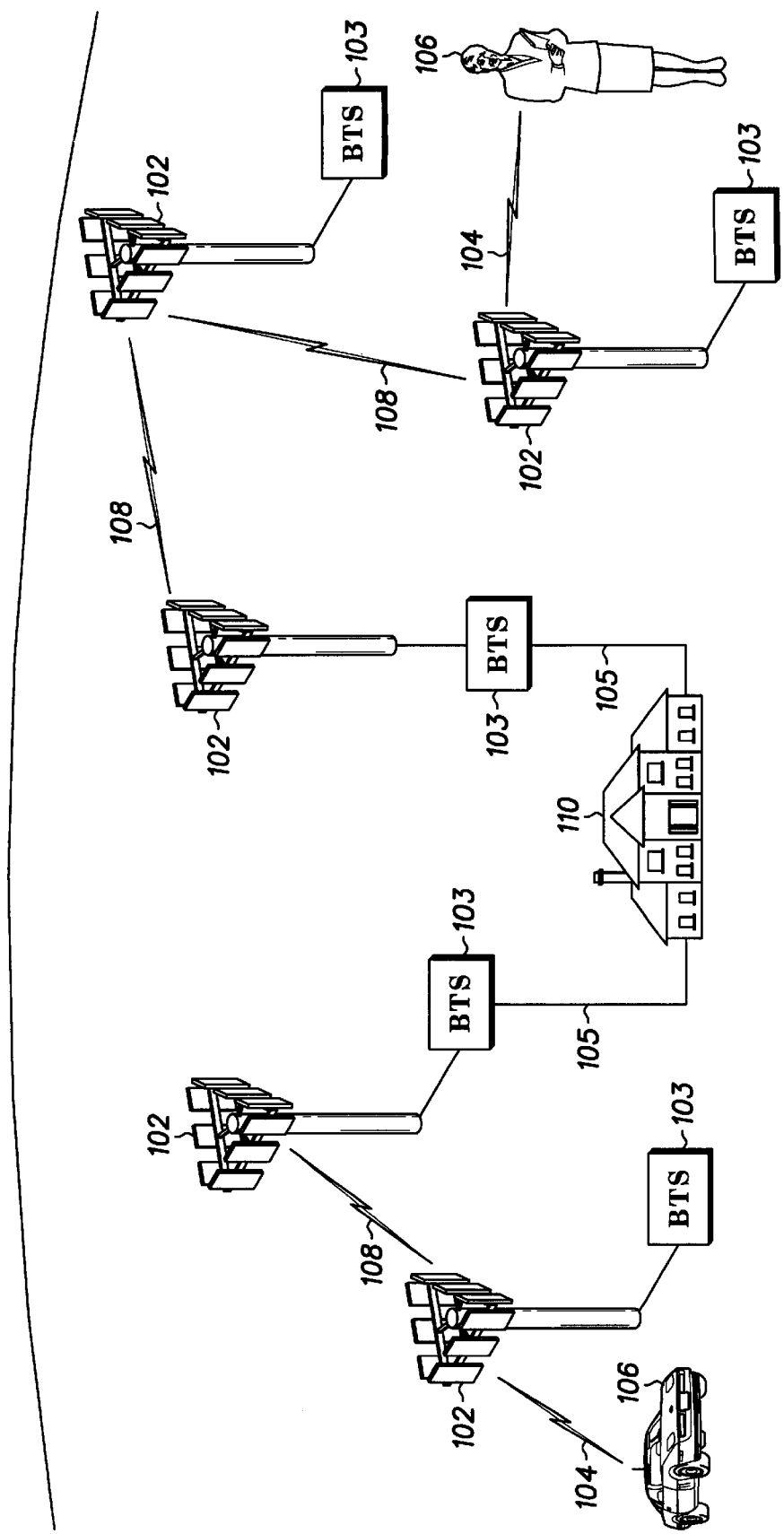
FIG. 1 illustrates a simplified block diagram of a terrestrial cellular communications network, known in the prior art.

The methods and apparatus of the present invention are implemented in a cellular communications network that can rapidly respond to changing capacity demands. This is accomplished, in several embodiments of the present invention, by a cellular communications network that integrates airborne transceivers with current terrestrial cellular network networks. This integration of airborne transceivers and terrestrial cellular networks is referred to herein as an "airborne cellular network" or "airborne network." These terms are not meant to imply that all cells of the network are provided by airborne transceivers, although that could be the case, in at least one embodiment.

The airborne transceivers are part of a payload carried by an aircraft, and these transceivers provide communication links between cellular communication units and one or more BTS. In this airborne network, each aircraft maintains a relatively stable flight pattern, typically over a fixed geographic area. Cellular beams projected toward the earth by an airborne transceiver provide communications coverage within that area.

One distinction between a conventional terrestrial network and the airborne network of the present invention is the impact that weather conditions may have on network performance. In general, severe weather may impact the ability of an aircraft to maintain continuous, high quality coverage over a particular geographic area. For example, an aircraft may have to alter its flight pattern to avoid one or more thunderstorms. These thunderstorms also may affect the quality of service possible on a subscriber link that passes through the storm. In addition, wind conditions or turbulence may impact the aircraft's current or achievable attitudes (i.e., pitch, roll, and yaw angles), roll rate, yaw rate, ground speed, and station keeping ability (i.e., the ability for the aircraft to maintain its position within a predictable, three dimensional space).

Another distinction between a conventional terrestrial network and an airborne network of the present invention is that, unlike the terrestrial network, the communication cells (referred to herein as "beams") provided by the aircraft payload may not be fixed with respect to the surface of the earth. This is due to the fact that the aircraft is continuously moving along its flight pattern. As the various beams provided by an aircraft payload sweep over a particular geographic area, a deviation in the regular flight pattern can drastically affect the network's coverage area, call handoff rate, and subscriber link performance. Such a flight pattern deviation may be necessitated by commands issued by an air traffic control center, for example.

Unlike a terrestrial network, a static set of performance parameters would not result in acceptable network performance for an airborne network. As explained above, this is because weather conditions, flight patterns, and aircraft movement continuously affect the aircraft's position and attitude, among other things. Therefore, the prior art approach of determining performance parameters on a rare and occasional basis would result in non-optimal airborne network performance.

The airborne communications network of the various embodiments overcomes these potential problems by rapidly determining performance parameters, particularly when various weather conditions and other factors affect the aircrafts' attitudes and positions. In addition, the airborne network of the various embodiments is able to rapidly change network operations in response to network performance and out of tolerance conditions.

Essentially, the network of the various embodiments consumes information regarding the aircraft's flight pattern, flight characteristics, and attitude, and information regarding subsystem status (e.g., the status of the network's various receivers, amplifiers, transmitters, antennas, etc.). From this information, the network adjusts network parameters to minimize the impact of varying coverage, handoff characteristics, and subscriber link performance experienced when using the airborne segment of the network.

In one embodiment, the airborne network is incorporated into a conventional, terrestrial cellular network without substantially modifying the network's infrastructure (i.e., BTS, MSOs, and cellular communications equipment). Essentially, the airborne transceiver is used as a repeater that is interjected between the cellular equipment and one or more BTS.

Figure 2:
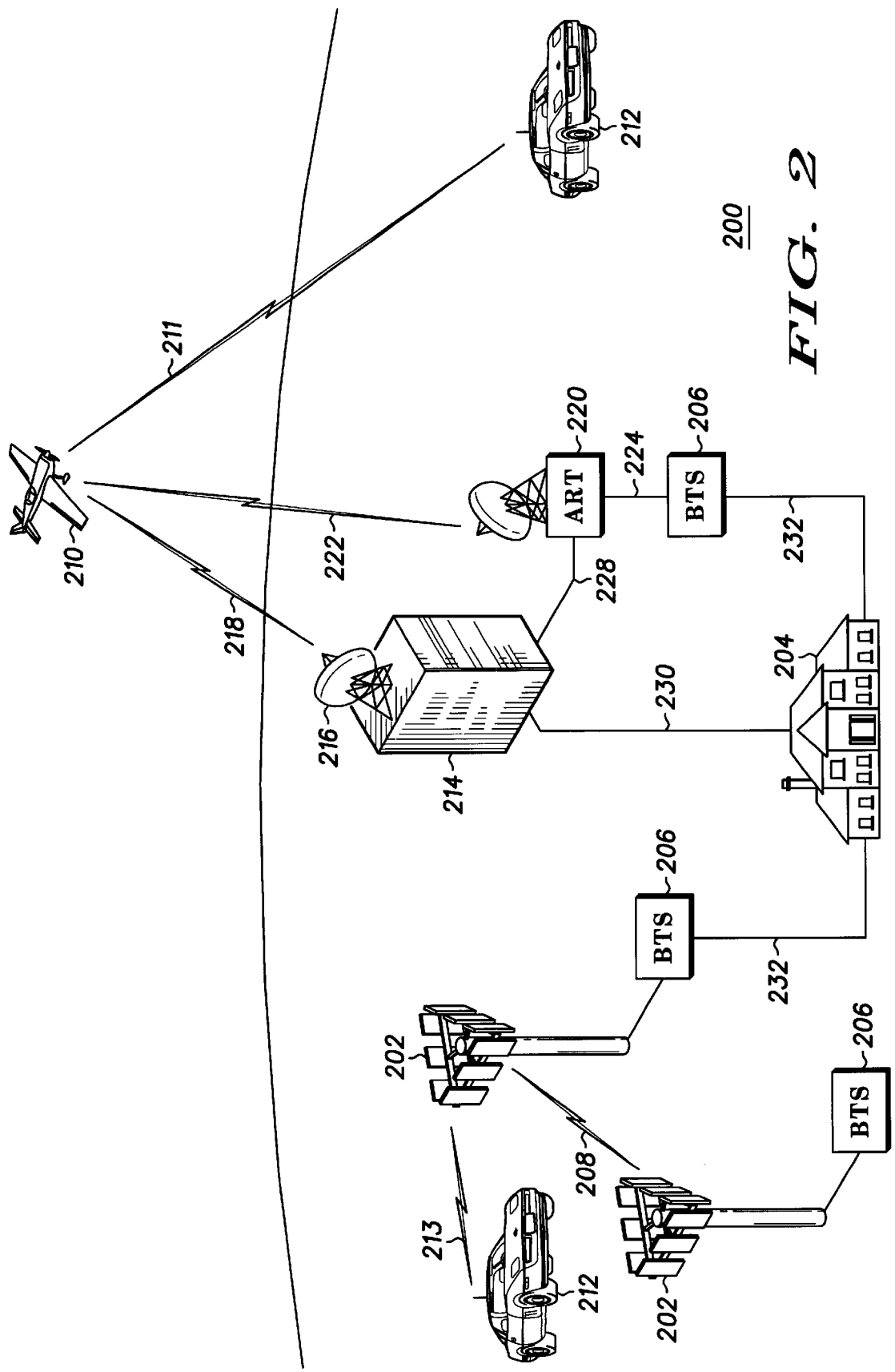
FIG. 2 illustrates a simplified block diagram of an airborne cellular communications network, in accordance with one embodiment of the present invention.

FIG. 2 illustrates a simplified block diagram of an airborne cellular communications network 200, in accordance with one embodiment of the present invention. Network 200 includes the elements of a conventional terrestrial network, including base station antennas 202, MSO 204, and BTS 206. BTS 206 can communicate with the MSO (and possibly each other) over links 208. In addition, network 200 includes multiple cellular communication units, which may be fixed or may be carried by mobile users 212. Generally, each of these elements performs similar functions as they would if incorporated into a conventional terrestrial system. Network 200 also includes one or more aircraft 210, one or more aircraft radio terminals (ART) 220, and control center 214. Each aircraft 210 carries a payload, which acts as a transceiver or repeater between the network's ART 220 (and, thus BTS 206) and multiple cellular communication units.

As used herein, a "cellular communication unit" means mobile or fixed communication equipment that sends and/or receives information over a wireless link to and/or from a transceiver, receiver, and/or transmitter of network 200. The transceiver, receiver, and/or transmitter could be associated with a base station antenna 202 or with a payload carried by aircraft 210. A cellular communication unit can be, for example, a cellular telephone, pager, radio, computer terminal or any other electronic device or network that sends and/or receives data over a wireless link.

Aircraft 210 could be, for example, an airplane, helicopter, balloon, dirigible or any piloted or unmanned, fixed wing, rotor wing or lighter-than-air vehicle that is capable of carrying a payload. In one embodiment, the aircraft is an airplane, whose pilot is responsible for flying the airplane (e.g., operating the manual controls and the autopilot system) and verbally communicating with air traffic control (ATC) and an aircraft operations center (AOC) (not shown), which will be described in more detail below. The aircraft also includes an aircraft flight management system (AFMS) (not shown), in one embodiment. The AFMS includes an autopilot system, GPS equipment, avionics equipment (e.g., instruments for measuring airspeed, roll angle, pitch angle, yaw angle, and turbulence, among other things), data collection equipment, and control equipment. Among other things, the AFMS is responsible for maintaining the correct flight pattern and profile via the autopilot system. As used herein, the term "aircraft" includes the aircraft itself, the AFMS, and an aircraft payload (not shown).

The aircraft payload includes antennas, radio frequency (RF) amplifiers, RF converters, and possibly analog-to-digital (A/D) and digital-to-analog (D/A) converters. The payload's antennas could be phased array antennas, reflectors, horns, patch antennas or some other type of antenna, in various embodiments. The payload also includes computing equipment that functions to control the payload antennas, converters, and other equipment.

As described previously, the payload functions as a transceiver or repeater, communicating data between cellular communication units and ART 220, which are each coupled to one or more BTS 206. In one embodiment, the payload communicates in one frequency range to ART 220 and in another frequency range to cellular communication units. The aircraft payload receives RF signals from ART 220 over ART link 222, downconverts those signals to appropriate cellular frequencies, and provides the cellular signals to the cellular communication units associated with users 212, via subscriber link 211. On the reverse path, the payload receives RF signals from the cellular communication units, upconverts the signals to the frequency range used on the ART link 222, and transmits the upconverted signals to ART 220. In one embodiment, RF signals are exchanged with ART 220 at frequencies within the C-band (e.g., 3–8 GHz), and they are exchanged with cellular communication units within a frequency range of about 800–1800 MHz. In other embodiments, signals could be exchanged with ART 220 or cellular communication units at frequencies within other ranges, depending, among other things, on the type of communications protocol used.

In one embodiment, network 200 also includes a control center 214, which communicates with aircraft 210 via antenna 216 and aircraft telemetry and control links 218. Control center 214 is a distributed or centralized computing apparatus, which includes an aircraft operations controller (AOC) (not shown) and subsystem status and control equipment (SS&C) (not shown). The AOC and the SS&C, which are described in more detail below, basically function to receive information regarding aircraft flight parameters and weather information, derive control messages from the parameters and weather information, and send the control messages to devices within the airborne or terrestrial segments of network 200. In addition, in various embodiments, a pilot can communicate verbally with the AOC or can enter changes into the aircraft's autopilot system, where those changes are thereafter transmitted to the AOC.

To communicate with ART 220 and MSO 204, control center 214 exchanges messages over ART control links 228 and MSO control links 230, respectively. In one embodiment, links 228 and 230 are hardwired links (e.g., coaxial or fiber optic cable), although either or both links 228 and 230 could be wireless links in other embodiments.

Although control center 214 is shown as being located in a single facility in FIG. 2, various portions of control center 214 could be located in separate facilities. For example, in various embodiments, portions or all of the control center functionality could be located in MSO 204, ART 220, BTS 206, aircraft 210 or other facilities (not shown).

As mentioned previously, network 200 includes one or more MSO 204. MSO 204 functions as a mobile switching center (MSC) and as a base station controller (BSC), in one embodiment. In the capacity of MSC, MSO 204 interfaces network 200 with a PSTN (not shown) and/or other network (s). In the capacity of BSC, MSO 204 controls all or some of the network's base station antennas 202, BTS 206, and ART 220. In some cases, MSO 204 receives information from control center 214, which MSO 204 uses to change tunable network parameters in order to improve the overall network performance. In one embodiment, the information originates from the SS&C equipment within control center 214, although it could originate from other network elements in other embodiments.

MSO 204 communicates with BTS 206 over links 232, respectively. In one embodiment, links 232 are hardwired links (e.g., coaxial or fiber optic cable), although they could be wireless links in other embodiments. Not all BTS 206 may have an associated ART 220. Thus, MSO 204 is capable of communicating with conventional BTS (i.e., BTS 206 without an ART 220) and with BTS that do have an associated ART 220.

Network 200 also includes an operations and maintenance center (OMC) (not shown), which is co-located with an MSO 204, in one embodiment. In alternate embodiments, the OMC is housed in a separate facility from MSO 204 or distributed across multiple facilities.

Essentially, the OMC is manned by a human operator who evaluates status and control messages received from MSO 204, aircraft 210, BTS 206, ART 220, and/or some other network element or external source. These messages could indicate, for example, that a piece of network equipment has failed, and/or how the various pieces of network equipment are performing.

When necessary, the OMC operator schedules maintenance operations. These maintenance operations include physically repairing, replacing or modifying all or a portion of an aircraft 210, BTS 206, ART 220, base station antenna 202 or some other network equipment. For example, the OMC may receive information indicating that a particular aircraft payload, BTS 206 or ART 220 has a damaged receiver. The OMC would then schedule a maintenance operation to repair or replace the receiver.

The OMC, thus, is essentially an entity that receives status and control information, and schedules maintenance operations. In various embodiments, other network elements, such as the AOC or some other automated or human entity, also or alternatively could schedule maintenance operations. The scheduling process involves contacting the people responsible for performing aircraft or network maintenance, and indicating that the maintenance operation should be performed.

In one embodiment, the OMC also can communicate directly or indirectly with MSO 204, BTS 206, ART 220, base station antennas 202 or aircraft 210 to cause one or more of those network elements to alter their operations based on the received status, control, and performance messages.

The network described in conjunction with FIG. 2 provides several advantages over prior art systems. In particular, aircraft 210 can be rapidly deployed to provide new or additional capacity to a geographic area, when needed, without taking a substantial amount of time for infrastructure installation, as is required in prior art satellite and terrestrial systems. In addition, an aircraft payload can be retrofitted and/or enhanced to provide even greater capacity.

Because aircraft are used in the various embodiments of the invention, the network must be able to compensate for various factors that affect aircraft. In particular, each aircraft is subject to weather conditions and ATC restrictions, which may affect the aircraft's flight parameters (e.g., the aircraft's flight pattern, position, attitude, and/or flight characteristics). Deviations in the aircraft's flight parameters can, in certain instances, affect the cellular coverage footprint or channels provided by the aircraft payload.

Figure 3:
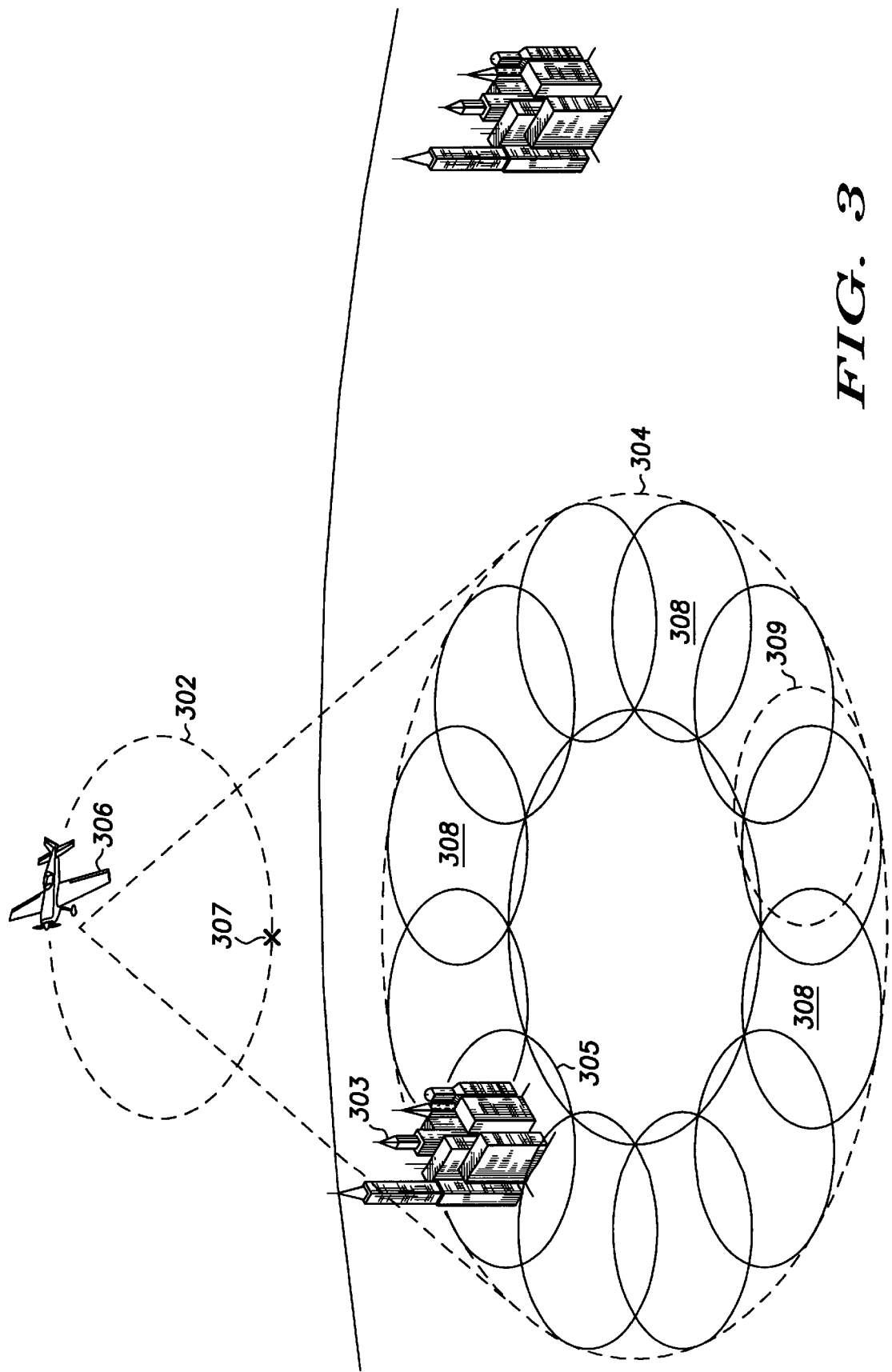
FIG. 3 illustrates an aircraft flight pattern and a coverage footprint projected by an aircraft within an airborne cellular communications network, in accordance with one embodiment of the present invention.

FIG. 3 illustrates an aircraft flight pattern 302 and a coverage footprint 304 projected by an aircraft 306, in accordance with one embodiment of the present invention. Within coverage footprint 304, multiple communication channels are provided within each of multiple beams 308 projected within footprint 304.

In one embodiment, footprint 304 has a radius in a range of about 50–200 kilometers, although footprints having larger or smaller radius could be employed in other embodiments. Additionally, in one embodiment, the beam radius is in a range of about 5–25 kilometers, although larger or smaller beam radius could be employed in other embodiments. In the embodiment shown, footprint 304 includes thirteen beams 308, providing anywhere from 1–300 channels per beam. In alternate embodiments, more or fewer beams 308 could be included within footprint 304, and each beam could provide a number of channels in a different range.

As aircraft 306 moves along its flight pattern 302, beams 308 sweep across the surface of the earth, making handoffs between beams necessary in order to maintain a cellular call. In one embodiment, the control center's AOC is responsible for performing aircraft management and controlling changes in the flight pattern based on weather information, failure information, and aircraft-to-aircraft handovers.

If no external factors affected the aircrafts' flight patterns, then the network could optimize various network parameters on a rare and occasional basis, and still maintain decent network performance. In real life, however, many factors affect an aircraft's flight pattern. For example, an aircraft may be instructed by ATC to deviate from its flight pattern due to other air traffic. Alternatively, some weather condition (e.g., a thunderstorm) may force an aircraft to alter its flight pattern, if the aircraft is to continue flying safely. In addition, other weather conditions, such as high winds and turbulence, may force the aircraft to adopt a new flight pattern or may affect the aircraft's attitude. These conditions could make it impossible for the aircraft to maintain continuous coverage over the geographic area using the same flight pattern. In addition, some of the conditions may cause the aircraft to project beams into other areas where RF energy from such beams is not desired.

In one embodiment, each aircraft 306 sends information to the control center indicating the aircraft flight parameters. In addition, the control center receives information directly from a weather center regarding current and predicted weather conditions within an area serviced by an aircraft. Using the parameters and weather information, the control center can communicate with the terrestrial network to alter network parameters in order to achieve optimal network performance.

In various embodiments of the present invention, the network takes flight parameter deviations caused by weather, ATC, and other factors into account by rapidly adjusting network parameters. These adjusted network parameters are distributed to the relevant network devices, which adjust their operations accordingly. In addition, the network is able to adjust the network parameters when the status of a network subsystem has changed and caused network performance to be degraded. In this manner, the network is able to maintain network operations at an optimal or near optimal level at all times.

Essentially, the network of the various embodiments consumes information regarding the aircraft's flight pattern and attitude, and information regarding subsystem status (e.g., the status of the network's various receivers, amplifiers, transmitters, antennas, etc.). From this information, the network adjusts various tunable network parameters to minimize the impact of varying coverage, handoff characteristics, and subscriber link performance experienced when using the airborne segment of the network. For example, these performance parameters include power control parameters, handoff parameters (e.g., thresholds, averaging parameters, and hysteresis), access parameters (e.g., the minimum received signal level required before a communication unit is granted access to the system), handoff candidate information for neighboring cells, and the designation of which channels are control channels and which are traffic channels.

Below is a list of several ways in which the network adjusts network parameters in order to optimize network performance:

Adjust handoff hysteresis and handoff threshold parameters on the basis of aircraft flight stability parameters, such as the aircraft's roll rate, yaw rate, and pitch rate, each of which worsens with increasing turbulence, wind speeds, and wind speed variation. These parameter adjustments are performed in order to prevent excessive handoff rates and the associated MSO processing capacities that would be required to support the unconstrained peak handoff rates.

Adjust the minimum user acquisition power threshold parameter (MAPT threshold) based on flight pattern changes. If the aircraft must change its flight pattern to work around weather activity, a degradation in coverage could be expected. The impact of this degradation on dropped call rates is minimized, in one embodiment, by increasing the MAPT threshold to prevent users from accessing the network unless the power on the user's control channel exceeds the higher threshold. This reduces the likelihood that a user will acquire the system successfully, then have its call dropped because of a change in the coverage characteristics during a weather mitigation maneuver, for example.

Adjust the power control parameters based on flight stability parameters. This is done to prevent excessive changes in the user equipment and BTS transmit powers that would consume processing capacity and aircraft power, and potentially lead to excessive handoff conditions or an increase in the dropped call rate.

Adjust handoff and acquisition parameters on a per beam basis, based on the aircraft flight pattern. As the aircraft moves along its flight pattern (e.g., a circular flight pattern over a particular geographic area), certain regions of the covered geographic area may experience a high handoff rate or reduced coverage. This is due to the relative motion of the beams, which sweep across the surface of the earth as the aircraft moves. In one embodiment, the network changes acquisition and handoff parameters dynamically for the beams that cover certain regions.

Adjust the control channel power level in order to change the size of a beam provided by the aircraft. By reducing the control channel power level on a particular beam and correspondingly increasing the relative control channel power level on adjacent beams, the size of the former beam is effectively reduced. This control could be advantageous, for example, if the beam is projected over a highly populated area. By reducing the size of the beam, the number of simultaneous calls supported by the beam is likely also to be reduced. In this manner, the network can strive to make every beam support roughly the same number of calls, independently from the geographic call density. The specific beam parameters would be periodically modified as the aircraft flies its circular pattern. For example, referring back to FIG. 3, when the aircraft 306 is at position 310 of the circular pattern 302, beam 305 is projecting onto a city 303, and the control channel power for beam 305 would be reduced to shrink the size of the beam 305. When the aircraft 306 is at a second position 307 of the circular pattern 302, the beam would have moved, and would project into a rural area (indicated by dashed area 309). Accordingly, the control channel power should be increased to increase the coverage of the beam.

Adjust network parameters based on subsystem failure. For example, if a beam power amplifier fails, it may result in a coverage gap. For a conventional system, a coverage gap is not as detrimental as for an airborne system, because the location of the coverage gap is static. For an airborne system, a beam outage is more detrimental because the coverage gap is swept over a large geographic region as the aircraft proceeds along its flight pattern. In one embodiment, if such a failure occurs, the MAPT parameter is adjusted to prevent users from acquiring the network unless the user's signal strength is high enough to survive a moving coverage gap. In various embodiments, other parameters would be adjusted to mitigate other types of subsystem failures.

The above list is meant to give examples of the types of network parameters that the network adjusts based on the varying conditions experienced by the airborne system. In various other embodiments, more, fewer or different network parameters could be adjusted based on the same or other variables.

Figure 4:
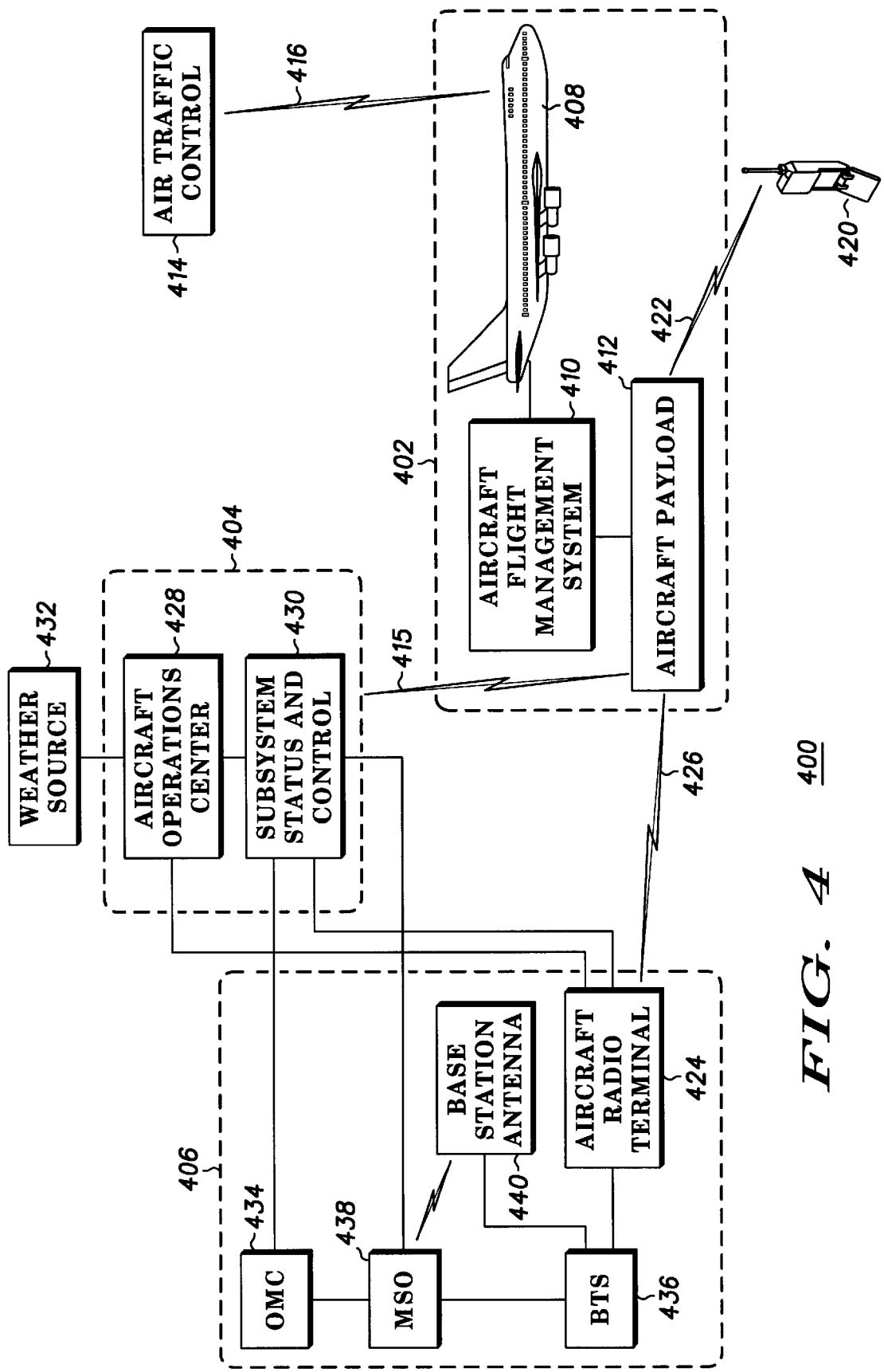
FIG. 4 illustrates a simplified block diagram of several network segments included in an airborne cellular communications network, in accordance with one embodiment of the present invention.

The network's process of maintaining operations at an optimal level is described in more detail in conjunction with FIG. 4, which illustrates a simplified block diagram of several network segments included in an airborne cellular communications network 400, in accordance with one embodiment of the present invention. As described previously, network 400 includes at least one aircraft 402, control center 404, and terrestrial cellular network 406.

Aircraft 402 includes the physical aircraft 408 itself, which carries an AFMS 410 and aircraft payload 412. As mentioned previously, aircraft 408 can be a fixed-wing, rotor-wing or lighter-than-air vehicle. In one embodiment, aircraft 408 is part of a fleet of airplanes dedicated to servicing cellular users within the network. Whenever capacity or coverage is required in an area, and that capacity or coverage cannot be provided by the terrestrial network, an aircraft is deployed to service the area. The aircraft pilot is notified of a particular flight pattern that will enable the aircraft 408 to service the area. The aircraft flight pattern is an instantaneous description of the aircraft's current or future position (i.e., latitude, longitude and/or altitude) and heading, and/or a description of a path along which the aircraft should fly. In various embodiments, one or multiple aircraft can be tasked with servicing a particular area.

Occasionally, the aircraft's pilot will communicate with ATC 414, over wireless RF link 416, and receive instructions and other information. ATC 414 is not part of network 400, but the aircraft pilot is required to follow its instructions. Often, these instructions are to alter the aircraft's flight pattern and velocity, among other things. In some cases, the pilot will key in the new flight pattern and velocity into an autopilot system, which forms a part of AFMS 410.

Besides the autopilot system, AFMS 410 includes GPS equipment, avionics equipment, data collection equipment, and control equipment, in one embodiment. In other embodiments, AFMS 410 may include more, fewer or different elements. Essentially, AFMS 410 measures and controls the aircraft's flight parameters.

Aircraft payload 412 collects, from AFMS 410, information relevant to the aircraft's flight parameters, and periodically transmits that information to control center 404 over RF link 418, in one embodiment. This flight parameter information could be an entire or partial description of the aircraft flight pattern, position, attitude or flight characteristics, describing the current or desired future state of the aircraft.

The aircraft position includes the aircraft's altitude, latitude, longitude, and/or other information (e.g., distance or direction from a landmark). The aircraft attitude includes the aircraft's roll, pitch, and/or yaw angles. Finally, the flight characteristics include the aircraft's velocity, heading, acceleration, and/or roll, pitch, and yaw rates.

In addition to collecting and transmitting flight parameter information to control center 404, aircraft payload 412 also provides communication channels to multiple cellular communication units 420 over RF links 422. As described previously, cellular communication units 420 send and receive data over wireless link 422 at a particular cellular frequency (e.g., in a range of about 800–1800 MHz) and using a particular cellular communication protocol (e.g., TDMA, CDMA, GSM or others). Aircraft payload 412 communicates this user data to one or more ART 424, via RF link 426. In one embodiment, as described previously, the information exchanged over link 426 is transmitted at a higher frequency (e.g., in a range of about 3–8 GHz) than the information exchanged over link 422.

Control center 404 includes AOC 428 and SS&C 430. Either or both AOC 428 and SS&C 430 receive the information relevant to the aircraft's flight parameters, which the aircraft sent to control center 404 over link 418. AOC 428 also receives weather information from weather source 432. Weather source 432 could be, for example, the National Weather Service, Flight Service Station (FSS), an Automated Surface Observation System (ASOS), a weather broadcast, the Internet, a fax service, a commercial weather provider, a television weather station or some other source. The weather information is considered, by AOC 428, to be an item of information that is relevant to the aircraft's flight parameters, since weather can significantly affect the aircraft's flight parameters.

AOC 428 passes flight pattern information to SS&C 430, which also receives telemetry information (i.e., information regarding the health and status of various devices within the network). From the flight pattern and/or telemetry information, SS&C 430 calculates one or more network parameters. As described previously, these network parameters indicate how various devices (e.g., aircraft 408, payload 412, MSO 438, BTS 436, OMC 434, ART 424 or cellular communication unit 420) within the network should control their operations. A device's "operations" refers to the device performing some communications or control function. This can include, for example, providing control and communication channels to communication units, determining whether a user is granted access to the system for a particular call, and handing off the user from one beam (or aircraft) to another, to name a few. An aircraft's operations also include controlling the flight parameters of the aircraft.

After calculating the network parameters, SS&C 430 sends one or more control messages derived from the network parameters to the relevant device or devices. These control messages enable the relevant device(s) to determine how to alter their operations or in the case of MSO 438, the messages enable MSO 438 to control operations of one or more BTS 436.

The control messages may include the network parameters themselves or may include instructions or other information derived from the network parameters. For example, the control messages may include information relevant to flight parameters (i.e., information describing the weather or desired flight parameters), and/or instructions to the aircraft or aircraft payload based on the weather or desired flight parameters.

For example, based on flight pattern information received from aircraft 402, SS&C 430 may determine that aircraft 402 should alter one or more flight parameters or alter the cellular beam pattern provided by its payload. Upon the aircraft's receipt of a control message from SS&C 430, aircraft 402 would respond by altering the appropriate flight parameter or cellular beam pattern, in accordance with the message. If aircraft 402 has altered a flight parameter as a result, aircraft 402 may transmit additional information to the control center 404 describing the new flight parameter.

In addition to sending messages derived from the network parameters to various network devices, SS&C 430 also determines, from the flight parameter and telemetry information, whether a maintenance operation should be performed on one of the network's devices. If so, then SS&C 430 sends a message describing the maintenance issue to an entity that schedules such maintenance operations. In one embodiment, this entity is the OMC 434, although it could be some other entity in another embodiment. For example, aircraft 402 could have sent a telemetry message to control center 404 indicating that a payload receiver has become non-functional. Upon receipt of this information, SS&C 430 would send a message to a maintenance entity to schedule repair of the aircraft's receiver. These maintenance operations could be scheduled for many pieces of equipment within the network's elements, including the aircraft 408, AFMS 410, payload 412, BTS 436, ART 424, and base station antenna 440.

As mentioned previously, SS&C 430 sends control messages to aircraft 402, and also to elements of the terrestrial network 406. In one embodiment, in order to affect the operations of one or more BTS 436, SS&C 430 sends control messages to MSO 438. MSO 438 in turn uses information within the control messages to control operations of one or more of the BTS 436. In some cases, MSO 438 sends the control message directly to BTS 436. In other cases, MSO 438 may evaluate the control message, and derive a modified control message to send to BTS 436.

When BTS 436 receives the original or modified control message from MSO 438, BTS 436 uses information within the message to control its operations. BTS 436 may receive the control message over a wired link or over a wireless link via base station antenna 440. In other embodiments, BTS 436 may receive a control message directly from SS&C 430 or from SS&C 430 via aircraft 402 and/or ART 424 or base station antenna 440.

Figure 5:
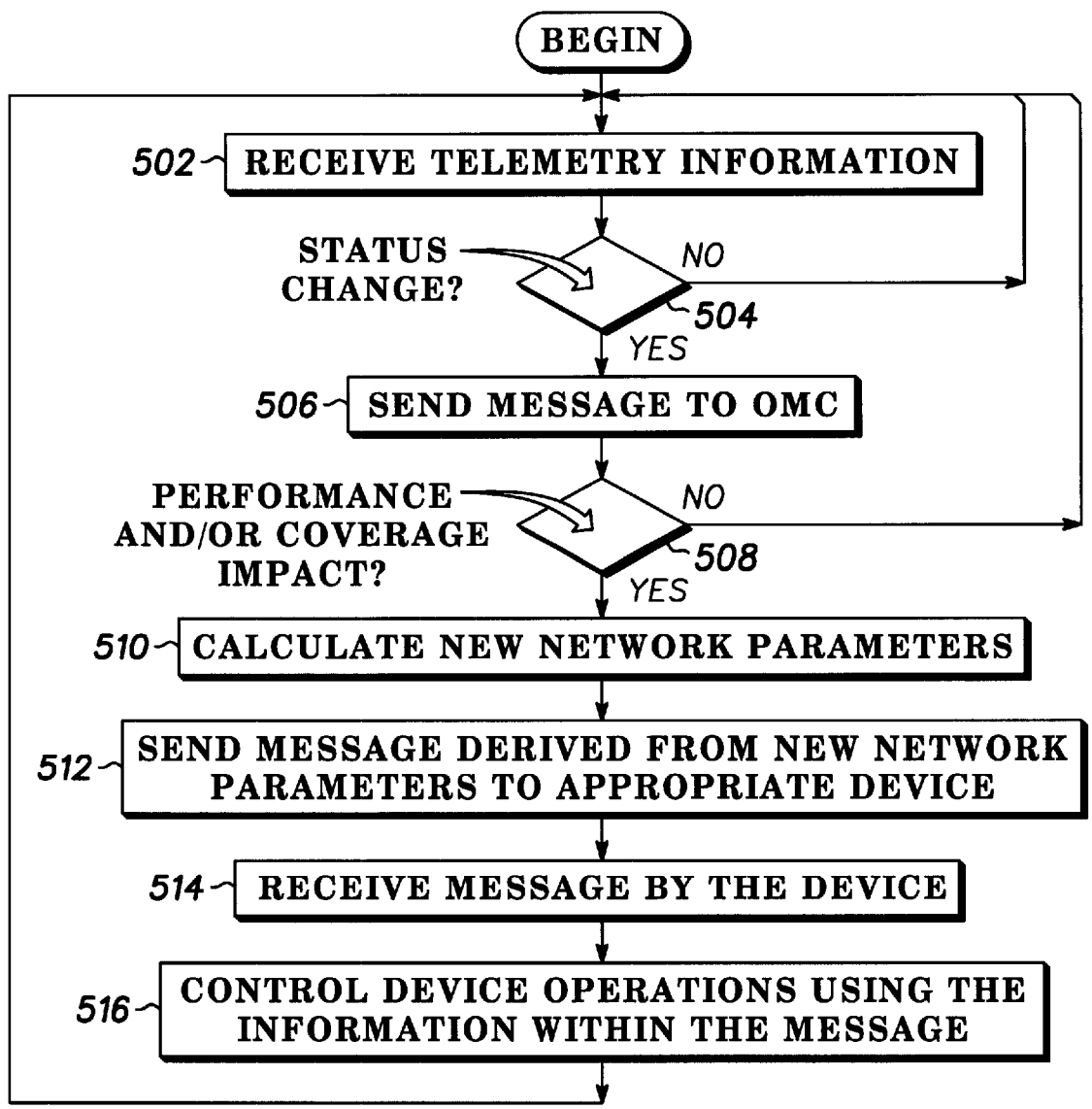
FIG. 5 illustrates a flowchart of a method for controlling operations of a cellular communications network based on received telemetry information, in accordance with one embodiment of the present invention.

The functioning of the various system segments will now be described in conjunction with FIGS. 5–11. FIG. 5 illustrates a flowchart of a method for controlling operations of a cellular communications network based on received telemetry information, in accordance with one embodiment of the present invention. The method begins, in block 502, by the control center receiving telemetry information. The telemetry information indicates the health and status of the various network subsystems, including the subsystems within AFMS, aircraft payload, ART, BTS, and base station antennas, in one embodiment. In other embodiments, telemetry from more, fewer or different network subsystems could be received.

From any received telemetry information, the control center determines, in block 504, whether a change to a subsystem status has occurred. A change to a subsystem status could be, for example, a failure of a piece of communications equipment. In one embodiment, the control center determines that a subsystem status change has occurred when the telemetry indicates that something has happened that will, may or has affected the system's ability to perform optimally. If no status change has occurred, the control center continues to receive telemetry information, as shown in FIG. 5.

If a status change has occurred, then the control center sends a message to an entity that schedules maintenance operations for the various network elements, in block 506. In one embodiment, this entity is the OMC, although it could be a different entity or set of entities in other embodiments. The maintenance scheduling entity then schedules an appropriate maintenance operation for the subsystem whose status has changed. For example, if the aircraft payload includes redundant amplifiers, and one of the redundant amplifiers has failed, the control center would send a message to the maintenance scheduling entity to schedule a repair operation on the failed amplifier.

A determination is made, in block 508, whether the status change has impacted the network performance or coverage. In the foregoing example, the status change would not result in a performance impact, because the operable redundant amplifier would be able to sustain system service. However, some failures may result in a coverage gap, for example, which is a significant performance impact.

A coverage change could include, for example, a movement of the coverage footprint such that all or a portion of the geographic area that the aircraft is supposed to cover is not covered. This may occur, for example, if the aircraft is forced to change its flight pattern due to ATC commands, control center commands, evasive maneuvers, and/or weather events.

In addition, a coverage change could occur if the aircraft changes its attitude. For example, if the aircraft is forced to roll, pitch or yaw due to wind, turbulence or other factors, the beam pattern could be projected into a different direction from the intended direction. In addition, turbulence might introduce additional frequency modulation on the subscriber links. And, an aircraft that is rolling (e.g., due to wind conditions) could induce rapid changes in signal strength, causing a user to be rapidly handed off between the aircraft's adjacent beams. The various weather factors could result in poor communication quality, a lack of coverage in some areas, and the projection of beams into areas where their RF energy is not intended.

A coverage change also could occur if a subsystem or component failure impacts the coverage capability of the aircraft, as described briefly in conjunction with blocks 504 and 506. If an aircraft experiences a coverage degradation, that gap is swept over a potentially very large geographical area as the aircraft executes its flight pattern.

If no performance or coverage impact has been encountered, the method continues to iterate as shown in FIG. 5. If a performance or coverage impact has resulted from the subsystem status change, then the control center calculates new network parameters, in block 510. New network parameters could apply to the operations of the aircraft payload, BTS, ART, and base station antennas, among other subsystems.

In block 512, the control center sends a message derived from the new network parameters to the appropriate device. If the new network parameters apply to other network subsystems, then the control center would send the message to the devices associated with those subsystems, as well. For example, if the new network parameters applied to the BTS, then the control center would send the message to the MSO, which in turn would create one or more messages to affect the BTS operations.

When the control message is received, in block 514, by the appropriate device or devices, then that device or those devices control their operations using the information within the message, in block 516. As mentioned previously, this could mean that the device alters its power control, handoff or acquisition processes, to name a few examples. The method then iterates as shown in FIG. 5.

Figure 6:
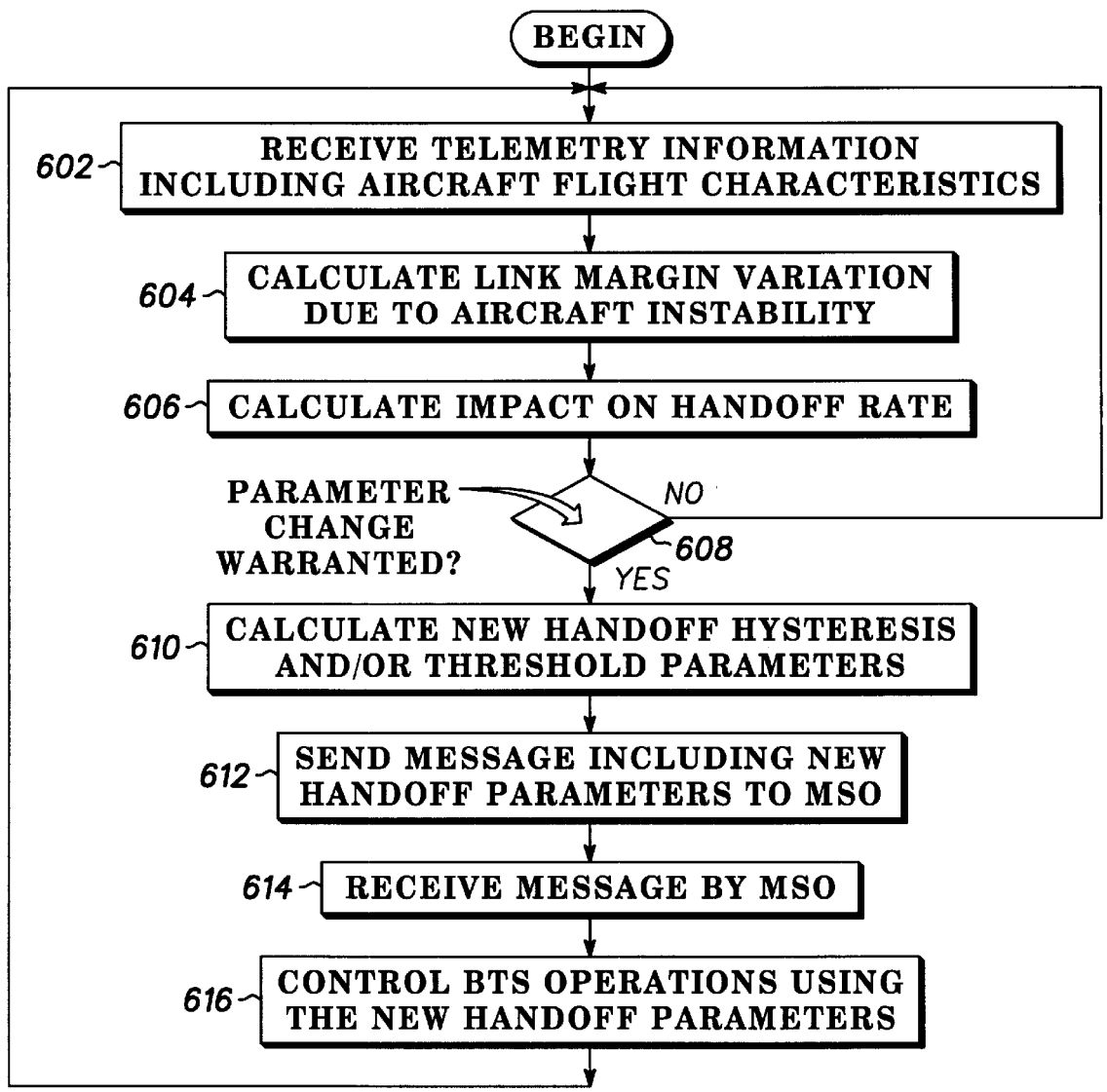
FIG. 6 illustrates a flowchart of a method for changing handoff parameters, when appropriate, in accordance with one embodiment of the present invention.
Figure 7:
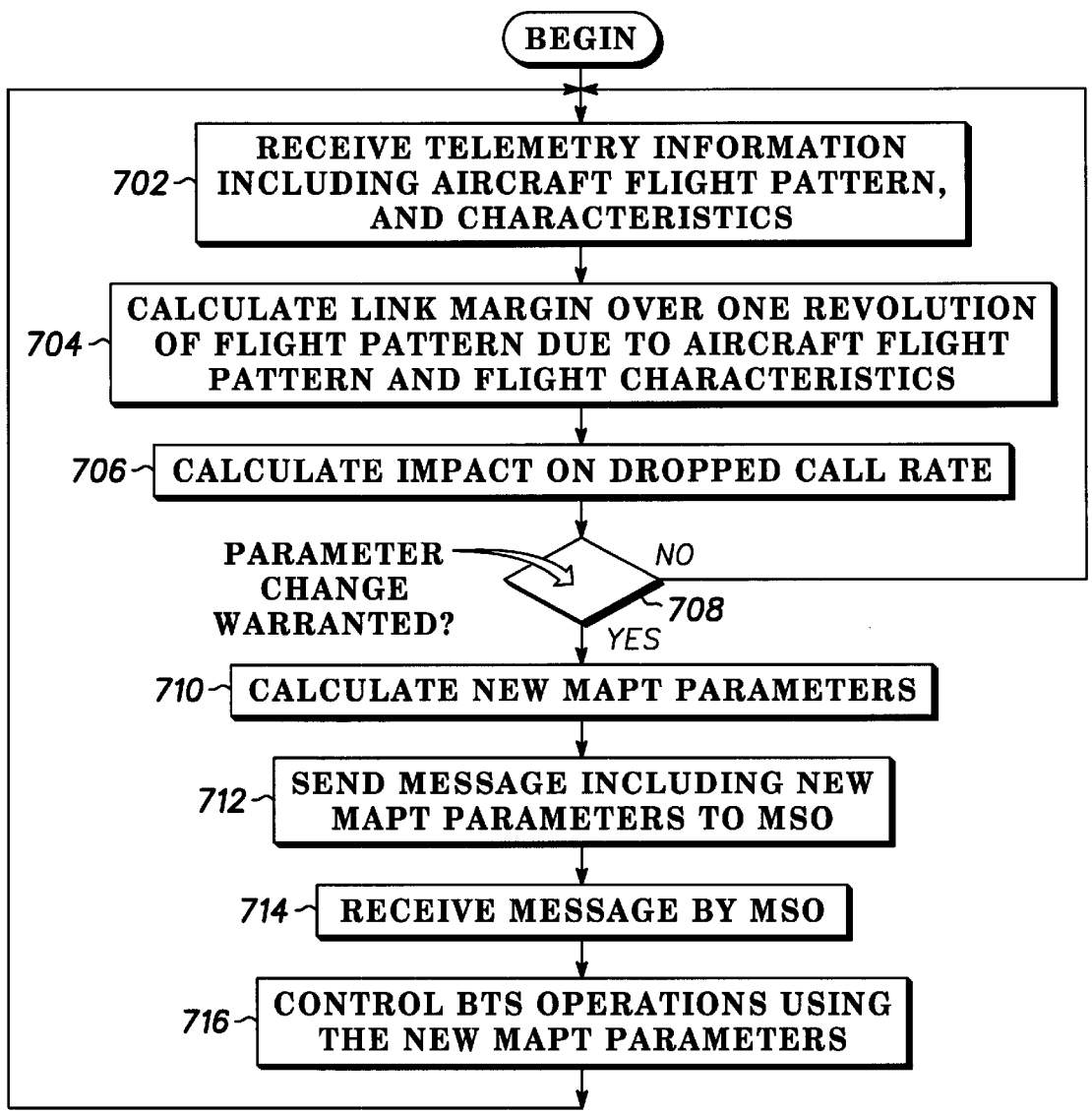
FIG. 7 illustrates a flowchart of a method for changing minimum acquisition power threshold parameters, when appropriate, in accordance with one embodiment of the present invention.
Figure 8:
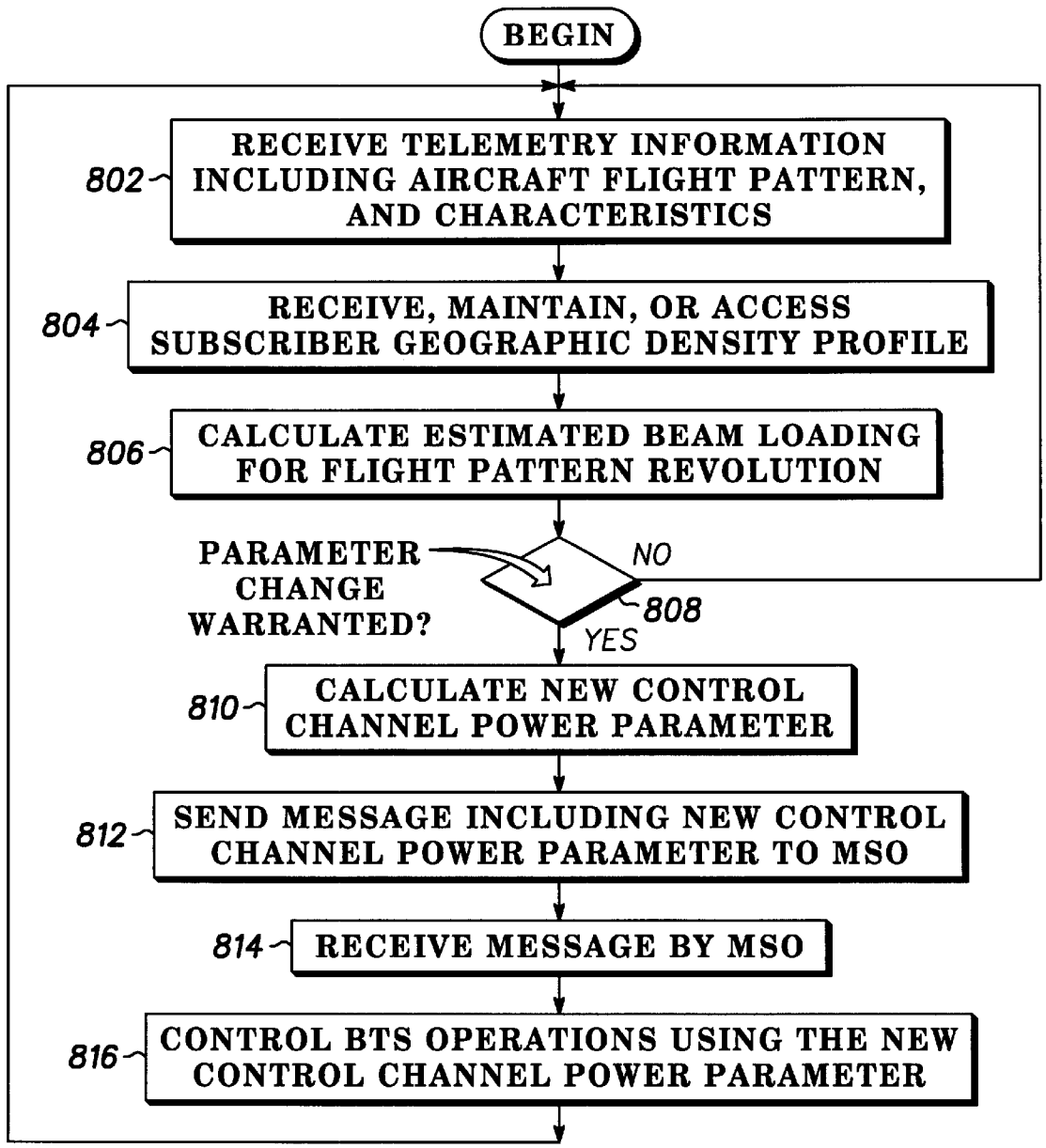
FIG. 8 illustrates a flowchart of a method for changing a control channel power parameter, when appropriate, in accordance with one embodiment of the present invention.

While FIG. 5 illustrates a relatively generic method for calculating network parameters, FIGS. 6–8 illustrate various embodiments of the method shown in FIG. 5 for specific network parameters. In particular, FIG. 6 illustrates a flowchart of a method for changing handoff parameters, when appropriate, in accordance with one embodiment of the present invention.

As an aircraft experiences roll, pitch, and/or yaw, variations in the projected beam pattern occur. These variations can cause an excessive handoff rate, meaning that cellular units on the ground are handed off with more frequency than they would be if the aircraft were not experiencing the unplanned roll, pitch, and/or yaw characteristics. In one embodiment, the effects on the beam pattern due to roll, pitch, and/or yaw characteristics are mitigated, by measuring aircraft flight parameters, and tuning associated network parameters (e.g., handoff hysteresis and handoff threshold parameters) based on calculations using these measurements.

The method begins, in block 602, by the control center receiving telemetry information, which specifically includes the aircraft flight characteristics (i.e., roll, pitch, yaw, and/or the rates of each of these flight characteristics). From this information, the control center calculates the link margin variation due to the aircraft's instability, in block 604. The control center then uses the calculated link margin variation, in block 606, to calculate the impact of the varying flight characteristics on the handoff rate. Typically, the less stable the aircraft roll, pitch, and yaw angles and rates, the greater the link margin variation and the greater the handoff rate. For example, an aircraft could be flying through severe turbulence, which causes the signal power to fluctuate dramatically and handoffs to occur with excessive frequency.

In one embodiment, the network determines that a handoff is warranted based on at least two handoff parameters. Thus, the handoff rate also is related to these two parameters. These handoff parameters include handoff hysteresis and handoff threshold. The handoff threshold parameter indicates that a handoff to another beam should not occur unless the other beam's control channel power is at or above a certain threshold signal strength.

Used in conjunction with the handoff threshold parameter, the handoff hysteresis parameters is based on signal strength, time or other factors. Instead of always handing off to the strongest beam, a hysteresis parameter could indicate that a handoff should occur only if another beam's strength is some amount of decibels stronger than the beam that the communication unit is currently using. Additionally or alternatively, a hysteresis parameter could indicate that a communication unit that has just handed off to another beam must wait some period of time before it can be handed off again. In other embodiments, more, fewer or different handoff parameters could be used to determine whether a handoff is warranted.

Referring back to FIG. 6, a determination is made, in block 608, whether the predicted handoff rate warrants a change in the then-current handoff parameters. A positive determination is made, in one embodiment, if the handoff rate exceeds a threshold. If no change in the handoff parameters is warranted, then the method iterates to block 602 as shown.

If a change in the handoff parameters is warranted, then the control center calculates new handoff hysteresis and/or threshold parameters, in block 610. The new handoff parameters are calculated so that the handoff rate will be within an acceptable range. In some cases, the parameters could be calculated to increase the handoff rate, and in other cases, the parameters could be calculated to decrease the handoff rate.

In block 612, the control center sends, to the MSO, a control message that includes the new handoff parameters. After the MSO receives the message, in block 614, the MSO controls operations of one or more BTS using the new handoff parameters, in block 616. Specifically, the MSO allows handoffs between BTS only when the new handoff parameters indicate that a handoff should occur. The method then iterates as shown.

In an alternative embodiment, the parameters may control the configuration of the aircraft payload also. In this case these new parameters are transmitted to the payload to be implemented. In another alternative embodiment, this information can also be used to modify the operation of the flight pattern. By adjusting the location of the flight pattern, better cellular performance may be obtained.

Besides controlling operations using handoff parameters, the network also controls some operations using MAPT (minimum acquisition power threshold) parameters, as described previously. FIG. 7 illustrates a flowchart of a method for changing MAPT parameters, when appropriate, in accordance with one embodiment of the present invention.

Again, as the aircraft experiences roll, pitch, and/or yaw flight characteristics, the variations in the projected beam pattern may cause an excessive fluctuation in signal power or link margin. In addition, changing the aircraft's flight pattern (e.g., flying a circular pattern with a larger radius) could also change the link margin variation over an iteration of the flight pattern.

These variations can result in an excessive dropped call rate (i.e., the rate at which communication units in the process of a call are dropped). In one embodiment, an excessive dropped call rate due to an altered flight pattern and/or the aircraft's flight characteristics is mitigated by measuring aircraft flight parameters, including the flight pattern itself, and tuning the MAPT parameter based on calculations using these measurements.

The method begins, in block 702, by the control center receiving telemetry information, which specifically includes the aircraft flight characteristics. In addition, the control center receives or maintains data describing the aircraft flight pattern. From this information, the control center calculates the link margin variation over one or more revolutions of the flight pattern, in block 704. The control center then uses the calculated link margin variation, in block 706, to calculate the impact of the varying flight characteristics and/or flight pattern on the dropped call rate. Typically, the less stable the aircraft roll, pitch, and yaw angles and rates, the greater the link margin variation and the greater the dropped call rate. For example, as with handoffs, if an aircraft is flying through severe turbulence, the signal power will fluctuate dramatically, and calls are likely to be dropped with excessive frequency.

A determination is made, in block 708, whether the predicted dropped call rate warrants a change in the then-current MAPT parameters. A positive determination is made, in one embodiment, if the dropped call rate exceeds a threshold. If no change in the MAPT parameters is warranted, then the method iterates as shown.

If a change in the MAPT parameters is warranted, then the control center calculates new MAPT parameters, in block 710. The new MAPT parameters are calculated so that the dropped call rate will be within an acceptable range. In some cases, the parameters could be calculated to increase the dropped call rate, and in other cases, the parameters could be calculated to decrease the dropped call rate.

In one embodiment, the MAPT parameters are calculated for one whole revolution around the aircraft flight pattern, and a table is generated for parameters versus aircraft location. The table uses the radial location of the aircraft on the circular pattern as its index, in one embodiment, although other indexes could be used in other embodiments. During operation, the MSO determines where the aircraft is via the telemetry link, reads the table entry corresponding to that location, and sends the proper parameters to one or more of the BTS. As the aircraft circles around, the MSO cycles through this table. This process is described in more detail in conjunction with FIG. 9. In block 712, the control center sends, to the MSO, a control message that includes the new MAPT parameters (or a table, as described above). After the MSO receives the message, in block 714, the MSO controls operations of one or more BTS using the new MAPT parameters, in block 716. Specifically, the MSO allows users to access the network only when their acquisition power meets or exceeds the MAPT. The method then iterates as shown.

In an alternative embodiment, the parameters may control the configuration of the aircraft payload also. In this case these new parameters are transmitted to the payload to be implemented. In another alternative embodiment, this information can also be used to modify the operation of the flight pattern. By adjusting the location of the flight pattern, better cellular performance may be obtained.

Another parameter that the network can tune to optimize its performance is the control channel power level. FIG. 8 illustrates a flowchart of a method for changing a control channel power parameter, when appropriate, in accordance with one embodiment of the present invention.

Cellular communication units monitor a control channel provided by the aircraft, in one embodiment. The control channel typically is a single channel transmitted in each beam. Based on the perceived power of each received control channel, a communication unit determines to which beam it will handoff. Generally, the communication unit hands off to the beam having the highest control channel power.

If all beams transmit control channels at an equal power, all beams will be relatively equal in size. In such a case, the number of communication units communicating in a particular beam depends almost exclusively on the density of active communication units on the ground. Because this density varies widely, for example, between urban and rural areas, some beams may be tasked with handling many more calls than other beams. If a beam is asked to handle more calls than the number of communication channels it provides, then some users will be denied service. In one embodiment, the uneven distribution of calls to beams is mitigated by estimating the beam loading, and tuning each beam's control channel power to effectively reduce or increase the relative size of each beam. The method begins, in block 802, by the control center receiving telemetry information, which specifically includes the aircraft flight characteristics. In addition, the control center receives or maintains data describing the aircraft flight pattern. Finally, the control center receives or maintains or accesses the geographic density profile for the network's subscribers, in block 804.

From this information, the control center calculates the estimated beam loading for one or more revolutions of the flight pattern, in block 806. A determination is made, in block 808, whether the estimated beam loading warrants a change in the then-current control channel power parameters. A positive determination is made, in one embodiment, if the imbalance in beam loading among the aircraft's beams is above a certain threshold. In addition, in some cases, the telemetry information might indicate that the aircraft should turn off or reduce power in some beams, as is the case when the aircraft is projecting beams into areas where they are not intended. If no change in the control channel power parameters is warranted, then the method iterates as shown.

If a change in the control channel power parameters is warranted, then the control center calculates new control channel power parameters, in block 810. The new control channel power parameters are calculated so that the imbalance in beam loading will be within an acceptable range. For some beams, the parameters could be calculated to increase the control channel power, thus effectively increasing the size of the beam and the number of subscribers the beam may be called on to support. In other cases, the parameters could be calculated to decrease the control channel power, thus effectively decreasing the size of the beam and the number of subscribers the beam may be called on to support.

In one embodiment, the control channel power parameters are calculated for one whole revolution around the aircraft flight pattern, and a table is generated for parameters versus aircraft location. This is similar to the process, described in conjunction with FIG. 7, of calculating multiple MAPT parameters based on aircraft location. This process is described in more detail in conjunction with FIG. 9.

In one embodiment, the control channel power parameters for each beam are time varying, meaning that the parameters may change during a revolution of the aircraft around its flight pattern. In another embodiment, the parameter for each beam is fixed for the duration of the flight pattern.

In block 812, the control center sends, to the MSO, a control message that includes the new control channel power parameters. After the MSO receives the message, in block 814, the MSO controls operations of one or more BTS using the new control channel power parameters, in block 816. The method then iterates as shown.

In an alternative embodiment, the parameters may control the configuration of the aircraft payload also. In this case these new parameters are transmitted to the payload to be implemented. In another alternative embodiment, this information can also be used to modify the operation of the flight pattern. By adjusting the location of the flight pattern, better cellular performance may be obtained.

Figure 9:
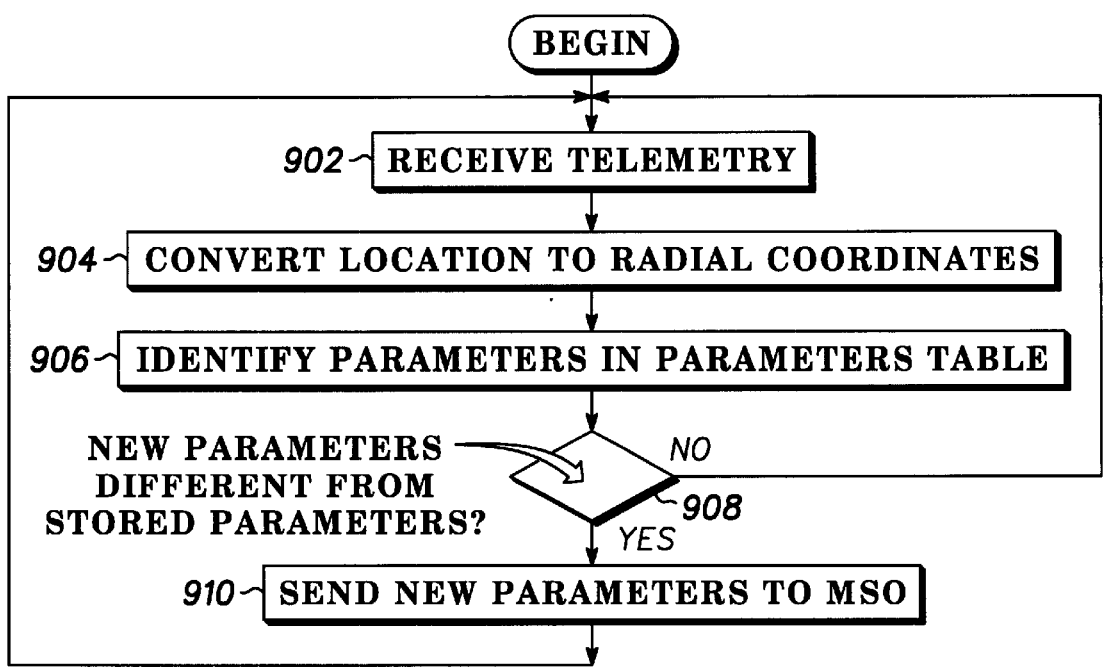
FIG. 9 illustrates a flowchart of a method for using a parameter table to determine parameters based on aircraft location in accordance with one embodiment of the present invention.

FIG. 9 illustrates a flowchart of a method for using a parameter table to determine parameters based on aircraft location in accordance with one embodiment of the present invention. The method begins, in block 902, by receiving telemetry, as is described in conjunction with block 702 (FIG. 7) or block 802 (FIG. 8), above. In one embodiment, the telemetry indicates the aircraft's location. In block 904, the location is converted to radial coordinates. The parameters associated with those coordinates are then identified in the parameter table, in block 906. A determination is made, in block 908, whether the newly calculated parameters are different from the stored parameters. If not, the procedure iterates as shown. If so, then the new parameters are sent to the MSO in block 910, as described above. The procedure then iterates as shown in FIG. 9.

In the foregoing detailed description, reference is made to the accompanying drawings, which form a part hereof, and in which are shown by way of illustration specific embodiments in which the invention may be practiced. These embodiments are described in sufficient detail to enable those skilled in the art to practice the invention. The foregoing detailed description uses terms that are provided in order to make the detailed description more easily understandable. It is to be understood that these terms and the phraseology employed in the description should not be construed to limit the scope of the invention.

It will be understood by those skilled in the art that the operations of the methods shown and described herein can be carried out in a different order than those described with reference to FIGS. 5–9. It will also be understood that while certain flowcharts have "Begin" and "End" blocks, in general the methods that they depict are continuously performed.

It will be further understood that FIGS. 2–4 are merely representational and are not drawn to scale. Certain proportions thereof may be exaggerated, while others may be minimized. FIGS. 2–4 are intended to illustrate various implementations of the invention, which can be understood and appropriately carried out by those of ordinary skill in the art.

It will be appreciated by those of ordinary skill in the art that any arrangement, which is calculated to achieve the same purpose, may be substituted for the specific embodiment shown. For example, although the description refers to implementing various functions of the present invention in particular network elements, many of these functions could be moved to other elements. For example, some or all of the control center functions could be moved into the terrestrial cellular network's OMC, MSO, BTS, and/or ART or into the aircraft payload or AFMS. In addition, some or all of the functions performed by the AOC could be performed by the SS&C, and vice versa. Also, some of the calculations performed by the control center, particularly calculations relating to network parameters, could be calculated by the aircraft, MSO or OMC. In addition, although handoffs and control channels are described on a per beam basis, handoffs also could occur and control channels also could be provided in various cells or sectors.

This application is intended to cover any adaptations or variations of the present invention that fall within its scope. The foregoing detailed description, therefore, is not to be taken in a limiting sense, and it will be readily understood by those skilled in the art that various changes in the details, materials, and arrangements of the parts and operations which have been described and illustrated in order to explain the nature of this invention may be made without departing from the spirit and scope of the invention as expressed in the appended claims.

What is claimed is:

1. A method for controlling operations of a cellular communications network, the method comprising:

receiving information relevant to flight parameters of an aircraft in flight, wherein the aircraft carries a payload that provides communication channels to multiple cellular communication units and also communicates with at least one base transceiver station (BTS) of the cellular communications network;

calculating one or more network parameters based on the information; and sending a message derived from the one or more network parameters to a device within the cellular communications network, wherein the device uses information contained within the message to control operations of the device.

2. The method as claimed in claim 1, wherein receiving information comprises receiving flight characteristic information.

3. The method as claimed in claim 2, wherein calculating one or more network parameters comprises:

calculating a link margin variation from the flight characteristic information;

determining whether the link margin variation indicates that a handoff rate is not within an acceptable range; and if the link margin variation indicates that the handoff rate is not within the acceptable range, calculating a handoff parameter, wherein the handoff parameter is a parameter in a group of parameters that includes a handoff hysteresis parameter and a handoff threshold parameter.

4. The method as claimed in claim 2, wherein calculating one or more network parameters comprises:

calculating a link margin variation from the flight characteristic information;

determining whether the link margin variation indicates that a dropped call rate is not within an acceptable range; and if the link margin variation indicates that the dropped call rate is not within the acceptable range, calculating a new minimum acquisition power threshold parameter.

5. The method as claimed in claim 2, wherein calculating one or more network parameters comprises:

calculating an estimated beam loading from the flight characteristic information and a subscriber geographic density profile;

determining whether the estimated beam loading indicates that a loading imbalance between beams is not within an acceptable range; and if the estimated beam loading indicates that the loading imbalance is not within the acceptable range, calculating new control channel power parameters.

6. The method as claimed in claim 1, wherein sending the message to the device comprises sending the message to a mobile switching office (MSO) within the cellular communications network, wherein the MSO uses information within the message to control the operations of one or more BTS.

7. The method as claimed in claim 1, wherein sending the message to the device comprises sending the message to the aircraft, wherein the aircraft uses information within the message to control the operations of the aircraft.

8. The method as claimed in claim 1, wherein calculating one or more network parameters comprises calculating a table of network parameters, wherein each entry in the table corresponds to a location of the aircraft along a flight pattern.

9. The method as claimed in claim 8, wherein calculating the table of network parameters comprises indexing each entry based on a radial location of the aircraft along the flight pattern.

10. The method as claimed in claim 1, wherein sending the message to the device comprises transmitting the message to the payload, wherein the payload uses the message to control operations of the payload.

11. The method as claimed in claim 10, wherein the aircraft uses the message to control a communication parameter of a cellular beam pattern provided by the payload.

12. A method for controlling operations of a cellular communications network, the method comprising:

collecting information relevant to flight parameters of an aircraft in flight, wherein the aircraft carries a payload that provides communication channels to multiple cellular communication units via a cellular beam pattern, and also communicates with at least one base transceiver station of the cellular communications network; and transmitting the information to a control center, wherein the control center calculates one or more network parameters based on the information, and sends the one or more network parameters to a device within the cellular communications network, and wherein the device uses the one or more network parameters to control operations of the device.

13. The method as claimed in claim 12, further comprising:
   receiving instructions from the control center to alter a communication parameter for the cellular beam pattern; and
   altering the communication parameter based on the instructions.

14. The method as claimed in claim 12, further comprising:
   receiving a control message from the control center; and
   using information within the control message to determine when handoffs are to occur.

15. The method as claimed in claim 12, further comprising:
   receiving a control message from the control center; and
   using information within the control message to determine when a communications unit may access the network.

16. The method as claimed in claim 12, further comprising:
   receiving a control message from the control center; and
   based on information within the control message, adjusting control channel power for one or more beams.

17. An apparatus for controlling operations of a cellular communications network, the apparatus comprising:
   an antenna that receives signals from and sends signals to an aircraft, wherein the aircraft carries a payload that provides communication channels to multiple cellular communication units, and also communicates with at least one base transceiver station of the cellular communications network; and
   a control center, coupled to the antenna, that receives, within the signals, information relevant to flight parameters of the aircraft, calculates one or more network parameters based on the information, and sends a message derived from the one or more network parameters to a device within the cellular communications network, wherein the device uses information contained within the message to control operations of the device.

18. The apparatus as claimed in claim 17, wherein the device is a mobile switching office (MSO), and the control center sends the message to the MSO, wherein the MSO uses information within the message to control the operations of the one or more base transceiver stations.

19. An apparatus for controlling operations of a cellular communications network, the apparatus comprising:
   an aircraft flight management system that collects information relevant to flight parameters of an aircraft in flight, wherein the aircraft carries a payload that provides communication channels to multiple cellular communication units via a cellular beam pattern, and also communicates with at least one base transceiver station of the cellular communications network; and
   an aircraft payload, coupled to the aircraft flight management system, that transmits the information to a control center, wherein the control center calculates one or more network parameters based on the information, and sends the one or more network parameters to a device within the cellular communications network, and wherein the device uses the one or more network parameters to control operations of the device.

* * * * *